United States Patent [19]

Morishita et al.

[11] Patent Number: 4,732,087
[45] Date of Patent: Mar. 22, 1988

[54] TRANSPORTATION SYSTEM OF A FLOATED-CARRIER TYPE

[75] Inventors: Mimpei Morishita; Teruo Azukizawa, both of Tokyo, Japan

[73] Assignee: Kabushiki Kaisha Toshiba, Kawasaki, Japan

[21] Appl. No.: 31,284

[22] Filed: Mar. 27, 1987

[30] Foreign Application Priority Data

Mar. 27, 1986 [JP] Japan .................... 61-69208

[51] Int. Cl.⁴ .............................. B60L 13/06
[52] U.S. Cl. ...................... 104/130.1; 104/284; 104/292; 104/303
[58] Field of Search .............. 104/35, 36, 37, 38, 104/130, 130.1, 281, 282, 283, 284, 290, 292, 295, 302, 303; 318/135, 687

[56] References Cited

U.S. PATENT DOCUMENTS

| 2,469,575 | 5/1949 | Ralston et al. | 104/130 X |
| 3,827,370 | 8/1974 | Hill | 104/130.1 |
| 3,845,718 | 11/1974 | Rogers et al. | 104/130 |
| 3,964,398 | 6/1976 | Breitling | 104/281 X |
| 4,109,584 | 8/1978 | Mihirogi | 104/130 |
| 4,555,828 | 12/1985 | Matimura | 104/130 X |

FOREIGN PATENT DOCUMENTS 50-150112 12/1975 Japan .

Primary Examiner—Sherman D. Basinger
Attorney, Agent, or Firm—Oblon, Fisher, Spivak, McClelland & Maier

[57] ABSTRACT

A transportation system of a floated-carrier type, according to the present invention, comprises a guide rail composed of main lines and branch lines, intersecting one another, a coupling section connecting the main and branch lines, and a carrier for carrying cargo, the carrier being capable of running along the guide rail. The carrier is suspended, in a non-contact manner, from the guide rail, by an electromagnetic attractive force. A transfer apparatus is provided at the coupling section. At the coupling section, the carrier, having so far been running along the main lines, is stopped, then rotated, then stopped from rotating when the carrier faces the branch lines, and then transferred to the branch lines, all in a non-contact manner. Thus, the mounting space of the transfer apparatus is small, and the carrier can be transferred from the main lines to the branch lines, without producing dust or noise.

10 Claims, 17 Drawing Figures

F I G. 8
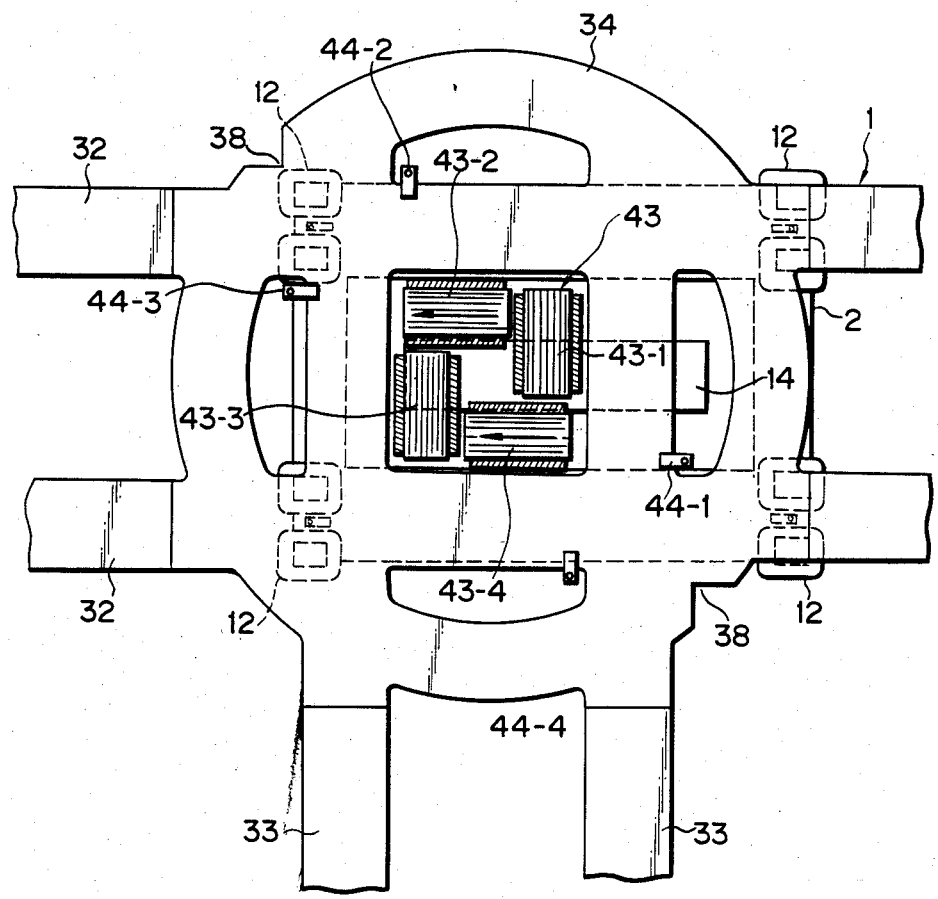

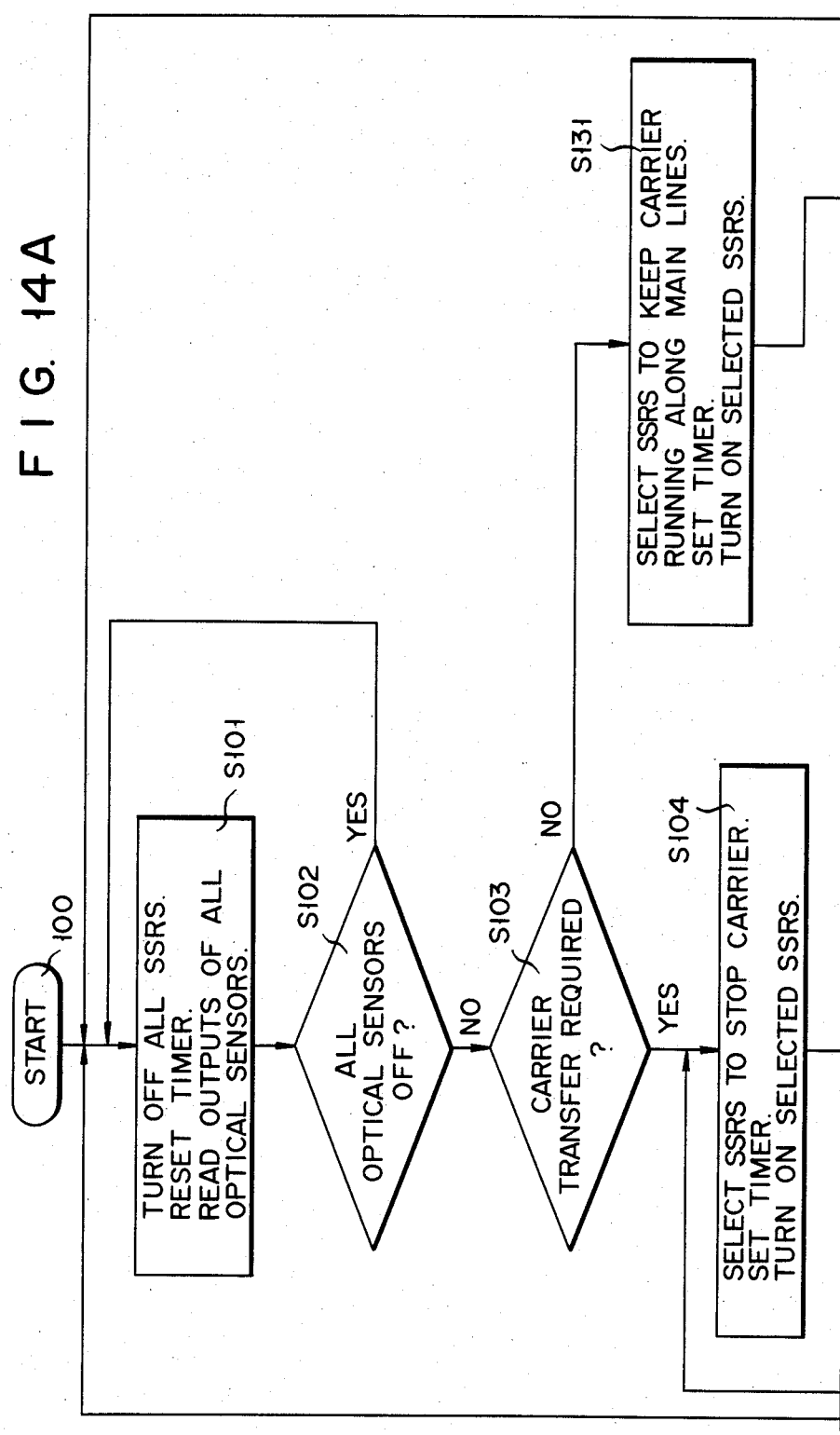

TRANSPORTATION SYSTEM OF A FLOATED-CARRIER TYPE

BACKGROUND OF THE INVENTION

The present invention relates to a transportation system of a floated-carrier type, and more particularly, to a transportation system of a floated-carrier type which comprises a guide rail composed of main and branch lines, in order that a carrier can be transferred from the main lines to the branch lines.

To increase office or factory automation, transportation systems have recently been installed in some buildings. Such systems are used to transport slips, documents, cash, samples, or the like, between a plurality of locations in the buildings.

In order to avoid spoiling the environment of the offices or factories, the transportation systems of this type are expected not to produce dust or high levels of noise. Thus, in one such conventional transportation system, described in U.S. patent application No. 726,975 now abandoned, filed previously by the inventor hereof, a carrier is kept floating, in a non-contact manner, under a guide rail, by means of an electromagnetic attractive force acting between the carrier and the rail, when the carrier is propelled along the rail.

The carrier must be transported smoothly to various locations in a building, and, to attain this, the guide rail is composed of main lines, which connect the principal locations in the building, and branch lines, which diverge from the main lines and connect various secondary locations therein.

It is necessary, therefore, to provide means for transferring the carrier, running along the main lines, to the branch lines, and vice versa. Prior art examples of the transfer means or apparatus are disclosed in the following publications:

U.S. Pat. No. 4,109,584 describes a transportation system, which is provided with a rail-switching device at a diverging section, where branch lines diverge from main lines. When the switching device is operated mechanically, the main lines are disconnected from one another, and are connected to the branch lines, so that a carrier can be transferred from the main lines to the branch lines.

In a system described in Japanese Patent Disclosure No. 50-150112, no rail switching device is provided, and main and branch lines are connected directly at a diverging section. A guide plate is provided at the diverging section, whereby the rollers of a carrier are guided from the diverging section to the branch lines. As the rollers slide along the guide plate, the carrier is transferred from the main lines to the branch lines.

As has been described above, however, the apparatus for transferring the carrier, from the main lines to the branch lines, requires a mechanical switching device. Therefore, the transfer apparatus is increased in size, thereby reducing the available space in the office. Moreover, the switching device is operated mechanically, and, especially in the system stated in Japanese Patent Disclosure No. 50-150112, the rollers of the carrier are in contact with the guide plate while the carrier is being transferred. As a result, noise is produced by the transfer apparatus.

Thus, such a transfer apparatus is liable to spoil the environment of the office, in which case the main lines should not be provided with transfer apparatuses. In this case, therefore, the carrier cannot run smoothly along the guide rail, and can reach its destination only after a long period of time.

SUMMARY OF THE INVENTION

The object of the present invention is to provide a transportation system of a floated-carrier type, in which a small-sized apparatus is used to transfer a carrier from main lines to branch lines, and in which noise is prevented from being produced by the transfer apparatus.

A transportation system of a floated-carrier type, according to the present invention, comprises a guide rail formed of main lines and branch lines intersecting one another, a coupling section connecting the main and branch lines, and a carrier for carrying cargo, the carrier being capable of running along the guide rail. The carrier is kept floating, i.e., in a non-contact manner, from the guide rail, by means of an electromagnetic attractive force. Transfer means is provided at the coupling section. At the coupling section, the carrier, having so far been running along the main lines, is stopped, then rotated, then stopped from rotating when the carrier faces the branch lines, and then transferred to the branch lines, all in a noncontact manner.

BRIEF DESCRIPTION OF THE DRAWINGS

FIGS. 6 to 11 are plan views of the transportation system shown in FIG. 1, with its guide rail cover removed, illustrating the way the carrier is transferred from the main lines to the branch lines;

FIGS. 14A, 14B, 14C, and 14D are flow charts showing the steps when the carrier is transferred from the main lines to the branch lines.

DETAILED DESCRIPTION OF THE PREFERRED EMBODIMENTS

Figure 1:
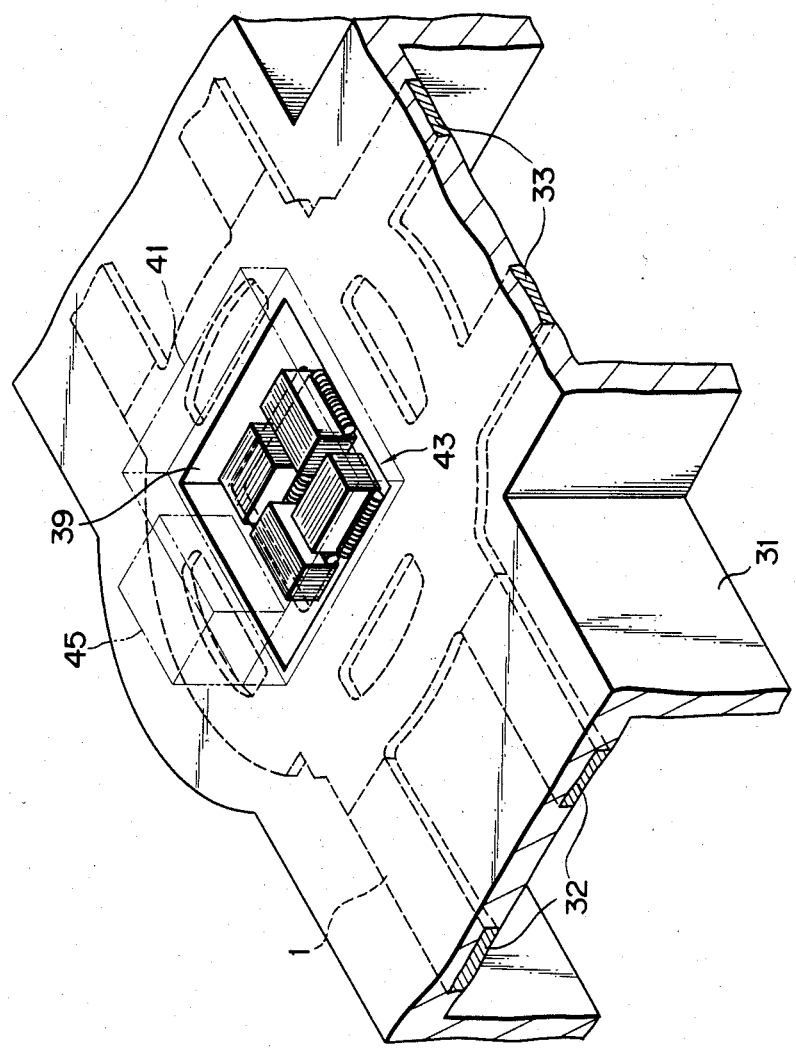
FIG. 1 is a perspective view of a transportation system of a floated-carrier type according to an embodiment of the present invention.
Figure 2:
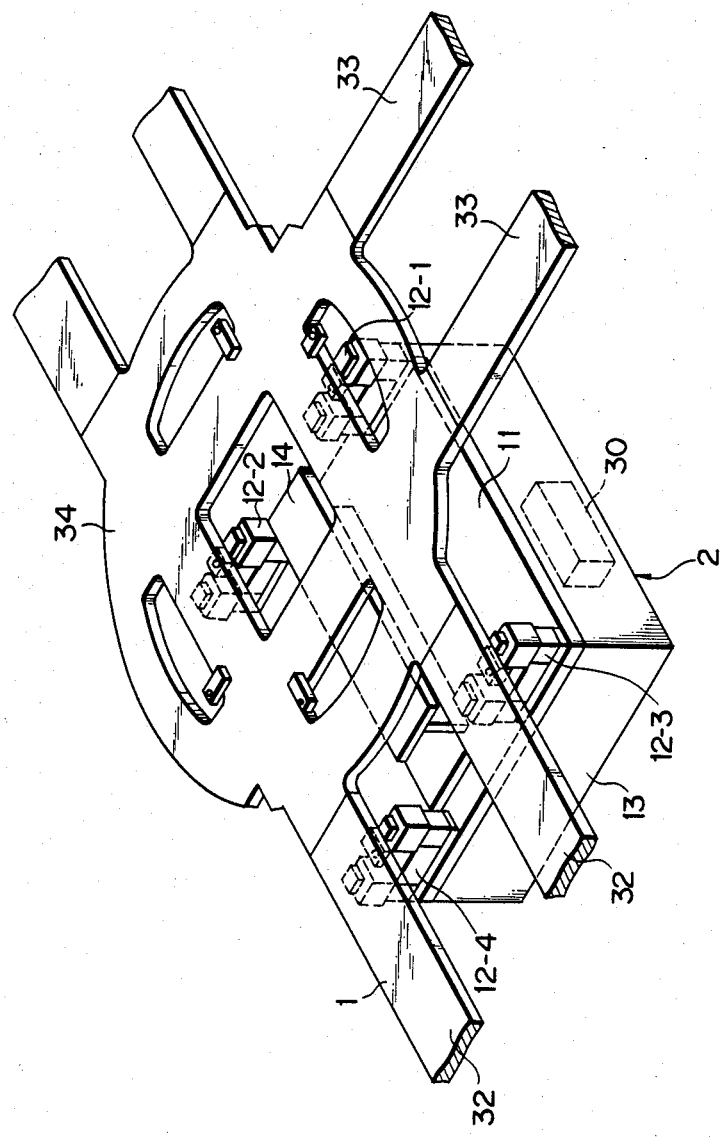
FIG. 2 is a perspective view of the transportation system shown in FIG. 1, with its guide rail cover and part of the transfer apparatus removed.

In a transportation system of a floated-carrier type, as shown in FIGS. 1 and 2, guide rail 1, including main lines 32 and branch lines 33, is arranged in an office. Carrier 2 is kept floating, in a non-contact manner, below rail 1, by means of a magnetic attractive force acting between carrier 2 and rail 1, as the carrier is propelled along the rail.

As is shown in FIG. 2, carrier 2 is provided with rectangular plate 11, facing the underside of guide rail 1. Magnetic units 12-1, 12-2, 12-3, and 12-4 are arranged on the four corners of the upper surface of plate 11.

They serve to cause carrier 2 to float below rail 1. Carrier box 13 is supported by the lower surface of plate 11. Reaction plate 14 is located in the center of the upper surface of plate 11, so as to face stators 43-1, 43-2, 43-3, and 43-4 of the four linear induction motors of transfer apparatus 43, which will be described in detail later.

Figure 4:
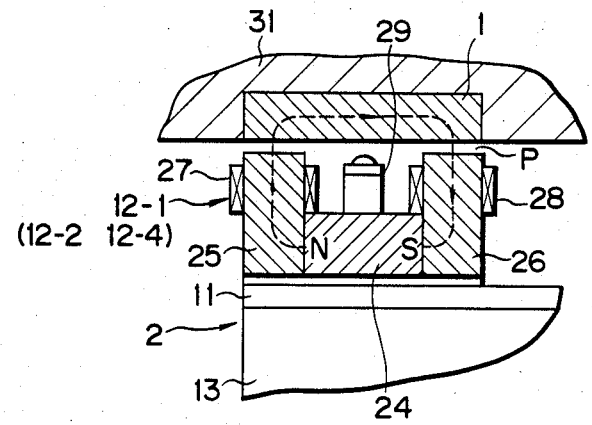
FIG. 4 is a sectional view of a magnetic unit for causing a carrier to float from a guide rail.

As is shown in FIG. 4, magnetic units 12-1 to 12-4 are each provided with yokes 25 and 26, facing guide rail 1. Conducting wires are wound around yokes 25 and 26, thus forming coils 27 and 28. Air gap P is defined between the top face of each yoke and the lower surface of rail 1. Permanent magnet 24 is used to couple yokes 25 and 26 magnetically. Thus, magnet 24, yokes 25 and 26, gaps P, and rail 1 constitute a magnetic circuit. Each magnetic unit is further provided with a gap sensor 29 for detecting the amount of clearance of gap P.

Carrier 2 is suspended from guide rail 1 in a non-contact-manner, by means of a magnetic attractive force acting between magnetic units 12-1 to 12-4 and guide rail 1. In this embodiment, units 12-1 to 12-4 are controlled by zero-power control device 30, so that the minimum necessary electric current is supplied to coils 27 and 28 when carrier 2 is made to float. In other words, four permanent magnets 24 always generate an attractive force equal to the total weight of carrier 2 itself and the load. At the same time, coils 27 and 28 are excited, so as to maintain the air gap clearance at which the attractive force between the magnetic units and rail 1 balances with the total weight of the carrier itself and the load. Coils 27 and 28 serve to subordinately cause carrier 2 to float. If the total weight of carrier 2 is changed by the load, the supply of current to coils 27 and 28 is controlled so that gap P is adjusted to a distance such that the attractive force from magnet 24 is equal to the total weight of carrier 2. In other words, by controlling the current supply to the coils, gap P is adjusted to a distance such that carrier 2 is caused to float by means of the magnetic energy of magnet 24 only, despite the existence of disturbances. (The zero-power control device is described in detail in U.S. patent application. No. 726,975/85, filed previously by the inventor hereof.)

Figure 3:
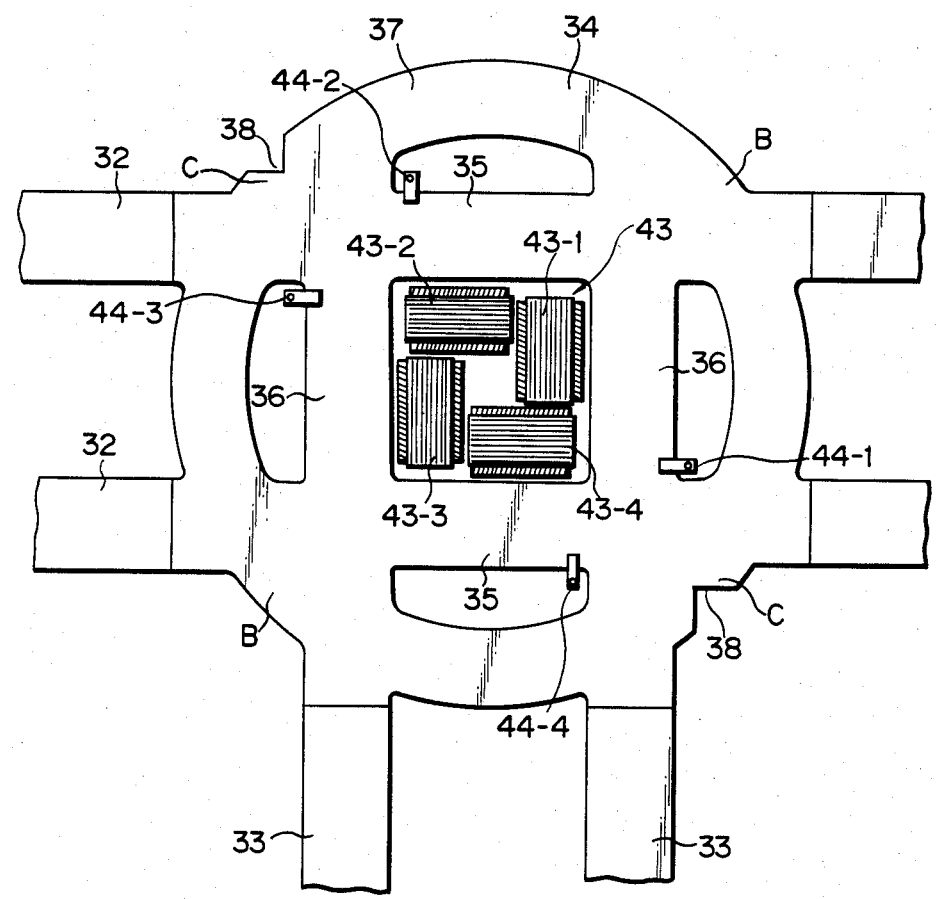
FIG. 3 is a plan view of the transportation system shown FIG. 1, with its guide rail cover removed.

Guide rail 1, formed of ferromagnetic material, as shown FIGS. 2 and 3, is composed of paired main lines 32 which extend parallel to each other, and paired parallel branch lines 33 which extend substantially at right angles to the main lines. The distance between each pair of lines 32 or 33 is substantially equal to that between each two adjacent magnetic units 12-1 and 12-2, or 12-3 and 12-4. The width of each line is substantially equal to the distance between yokes 25 and 26.

As is shown in FIG. 3, moreover, main and branch lines 32 and 33 are connected by coupling plate 34. Plate 34 is formed with a pair of main-line connecting portions 35 and a pair of branch-line connecting portions 36. Connecting portions 35, which are connected to main lines 32, are spaced at a distance equal to that between lines 32. Connecting portions 36, which are connected to branch lines 33, are spaced at a distance equal to that between lines 33. Portions 35 intersect portions 36 substantially at right angles. Portions 35 and 36 are surrounded by ring-shaped guide portion 37, whose diameter is equivalent to the diagonal length of magnetic units 12-1 and 12-4. Ring-shaped guide portion 37 is formed with four junctions B and C. The magnetic resistance is low at two junctions B. When carrier 2 is stopped under plate 34, therefore, it is attracted thereto at junctions B. Thus, carrier 2 is positioned accurately, with respect to coupling plate 34, when the carrier is stopped. Notch portions 38 are formed individually at another two junctions C. The magnetic resistance is higher at portions 38 than at junctions B. Carrier 2 is rotated counterclockwise along guide portion 37, and is then stopped at a position where it faces one of the branch lines. Thus, the carrier is stopped accurately at a predetermined position, because higher magnetic resistance at notch portions 38 prevents carrier from overrotating.

As is shown in FIG. 1, main and branch lines 32 and 33 and coupling plate 34 are fitted with guide rail cover 31 for protection. Opening 39 is formed in the center of cover 31. Support plate 41 for supporting stators 43-1 to 43-4 is situated over opening 39.

As is shown in FIGS. 1 and 3, stators 43-1 to 43-4 of the four linear induction motors are fixed to the lower surface of support plate 41. They constitute transfer apparatus 43 for transferring carrier 2 from main lines 32 to branch lines 33. Stators 43-2 and 43-4 are arranged so as to apply a propelling force, along the main lines, to carrier 2. On the other hand, stators 43-1 and 43-3 are arranged so as to apply a propelling force, along the branch lines, to carrier 2. Also, stators 43-2 and 43-4 and stators 43-1 and 43-3 are arranged alternately, so as to be symmetrical with respect to the center of ring-shaped guide portion 37. When all of stators 43-1 to 43-4 are supplied with an electric current, in a predetermined direction, they apply a turning force to carrier 2.

Main-line connecting portions 35 and branch-line connecting portions 36 are fitted with reflector-type optical sensors 44-1, 44-2, 44-3, and 44-4, respectively. Each of these sensors emits light to irradiate reaction plate 14 of carrier 2, and senses light reflected from plate 14. Thus, sensors 44-1 to 44-4 detect the position of carrier 2 relative to coupling plate 34.

Figure 5:
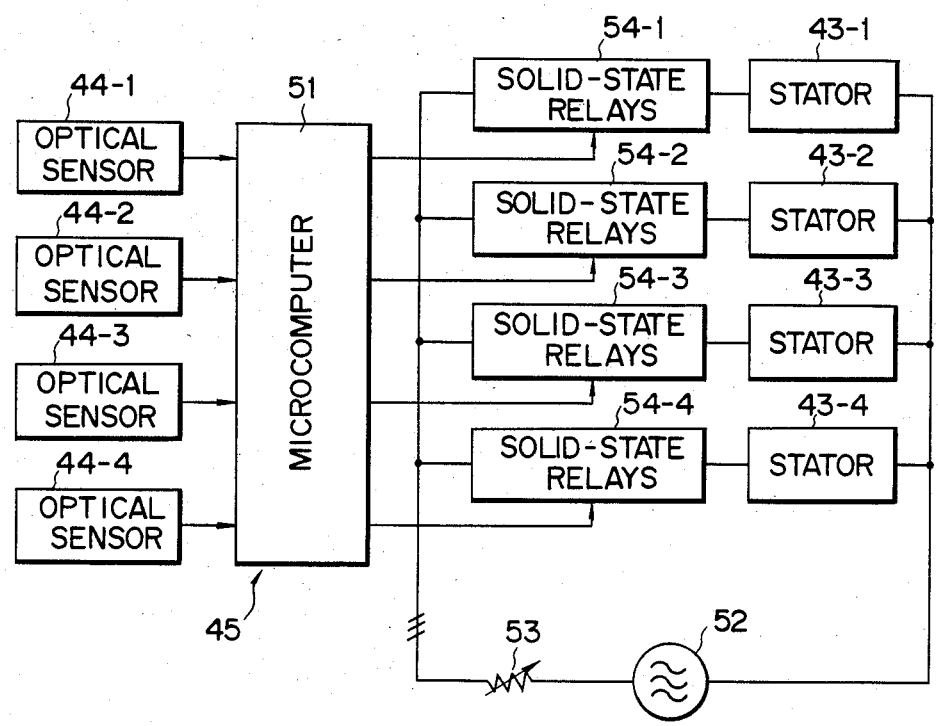
FIG. 5 is a block diagram of a control device for controlling the transfer apparatus of the transportation system shown in FIG. 1.

In control device 45 of transfer apparatus 43, as is shown in FIG. 5, stators 43-1, 43-2, 43-3, and 43-4 are connected with solid-state relays 54-1, 54-2, 54-3, and 54-4, respectively, for switching their corresponding stators. Stators 43-1 to 43-4 and relays 54-1 to 54-4 are connected to three-phase AC power source 52, by means of variable resistor 53. Detection signals from optical sensors 44-1 to 44-4 are applied to the input of microcomputer 51. Then, microcomputer 51 delivers commands to relays 54-1 to 54-4.

In control device 45, microcomputer 51 determines the timing for the application of the propelling force to carrier 2, the timing for the stopping of carrier 2, or the timing for the application of the turning force to carrier 2, in accordance with the position of carrier 2, detected by optical sensors 44-1 to 44-4. In response to commands based on the judgment of microcomputer 51, solid-state relays 54-1 to 54-4 supply stators 43-1 to 43-4, respectively, with current, in the predetermined direction. If stators 43-2 and 43-4, for example, are supplied with current, a traveling magnetic field is generated in stators 43-2 and 43-4, so that the current is induced to reaction plate 14. Through an interaction between the traveling field and the induced current, plate 14 is subjected to thrust from stators 43-2 and 43-4, and a propelling force along the main lines is applied to carrier 2. By changing the phase of the current supplied to the stators, the respective directions of the traveling field in the stators and the thrust on plate 14 can be varied, thus producing a braking force. If, on the other hand, stators 43-1 and 43-3 are supplied with the current, a propelling force along the branch lines is applied to carrier 2.

When all of stators 43-1 to 43-4 are energized so as to produce the traveling field in the predetermined direction, carrier 2 is subjected to a turning force. Thus, the stators to be energized are selected by microcomputer 51, and carrier 2 is transferred in the desired direction.

Meanwhile, carrier 2, made to float, by means of the magnetic unit, is propelled along main or branch lines 32 or 33, by a transportation system (not shown) for main- or branch-line transportation, which includes linear induction motors (not shown). Thus, reaction plate 14 is subjected to thrust from stators of the induction motors of the transportation system, and a propelling force along main or branch lines 32 or 33 is applied to carrier 2.

Figure 14B:
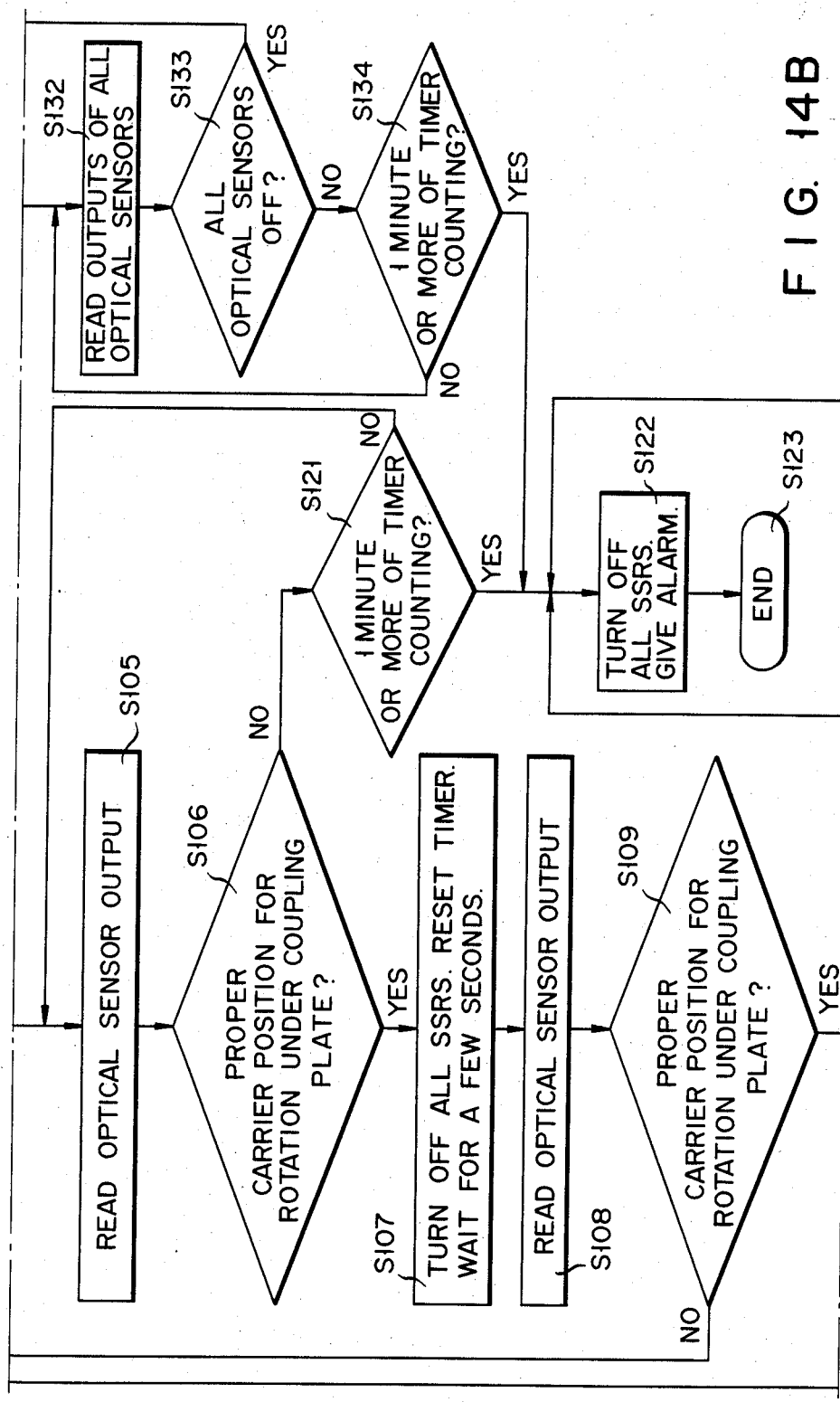
Figure 14C:
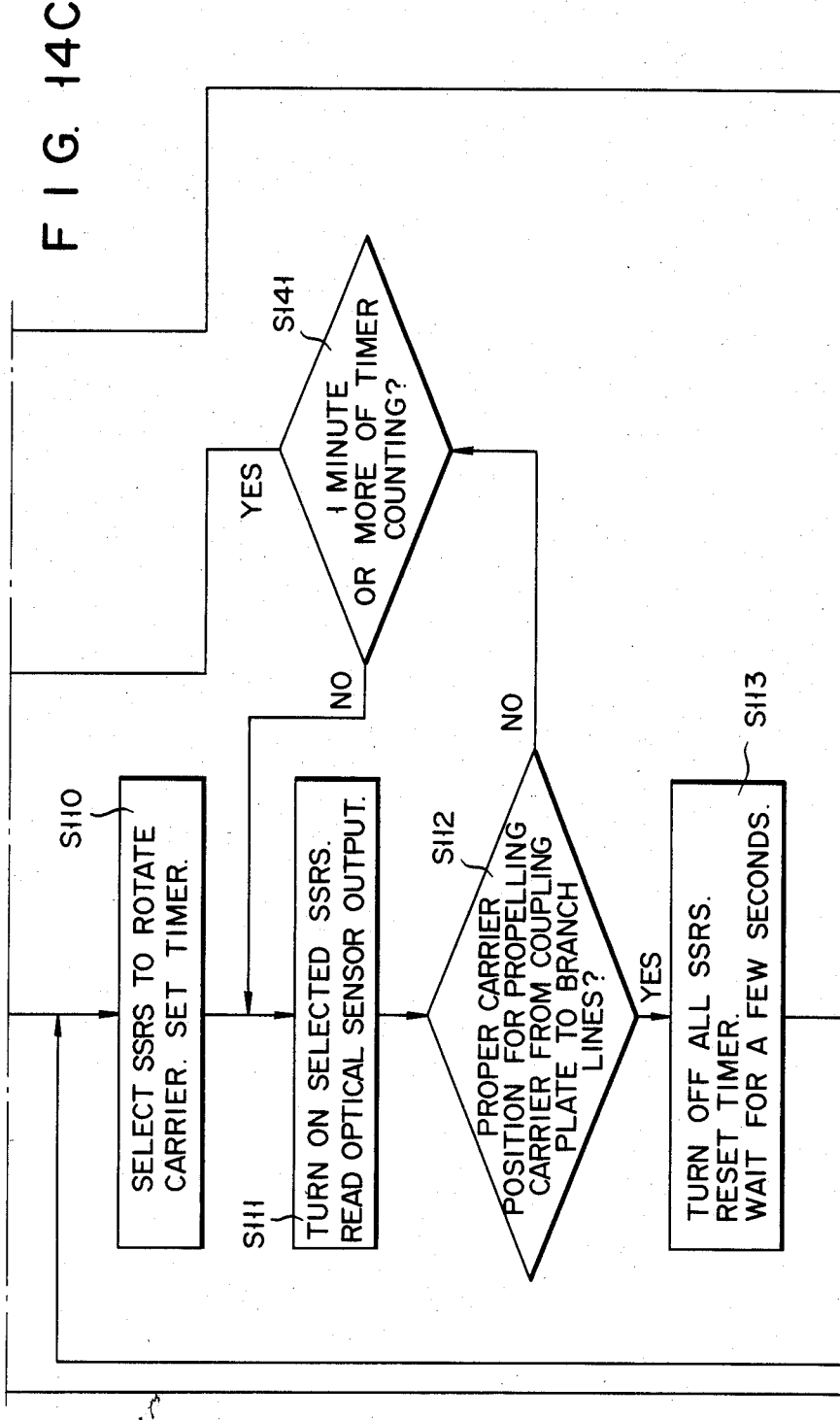
Figure 14D:
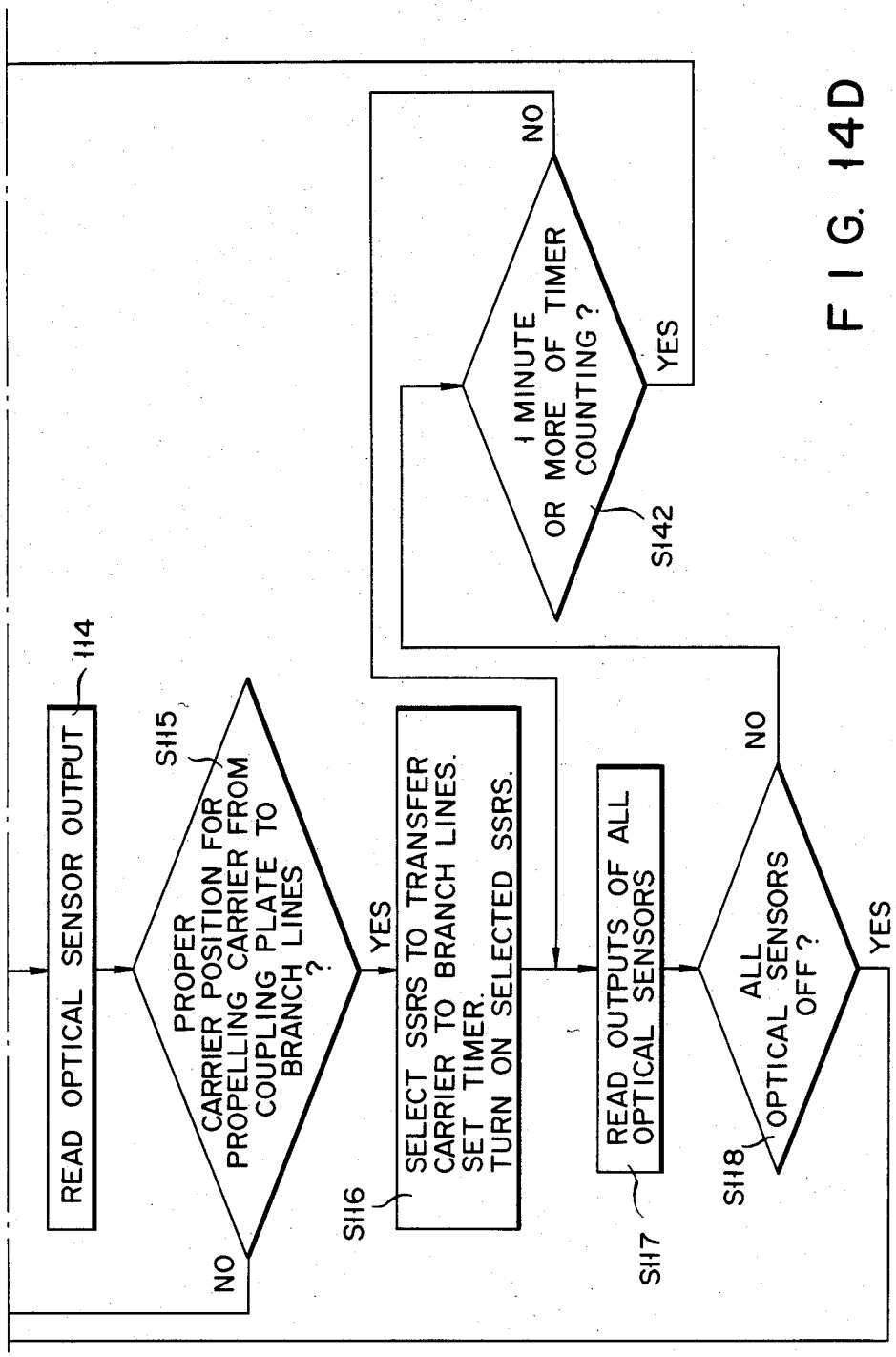

While it is running along main lines 32, carrier 2 is transferred to branch lines 33 in accordance with the flow chart of FIG. 14. First, carrier 2 is stopped under coupling plate 34. Then, whether or not carrier 2 is stopped at a proper position, for the rotation of carrier 2 under plate 34, is determined. If not, the stop position of carrier 2 is adjusted. When it is located in the proper position, carrier 2 is rotated under plate 34. Thereupon, whether or not carrier 2 is rotated through a predetermined angle is determined. If not, the stop position of carrier 2 is adjusted. When carrier 2 is stopped at the predetermined stop position, it is transferred from coupling plate 34 to branch lines 33. Referring now to FIG. 14, the individual steps of the flow chart will be described in detail.

In step 101, all the solid-state relays (SSRs) are turned off, in response to the commands from microcomputer 51, before carrier 2 reaches the location of coupling plate 34. In this state, none of stators 43-1 to 43-4 are energized, and a timer is reset. The outputs of all optical sensors 44-1 to 44-4 are read.

Figure 6:
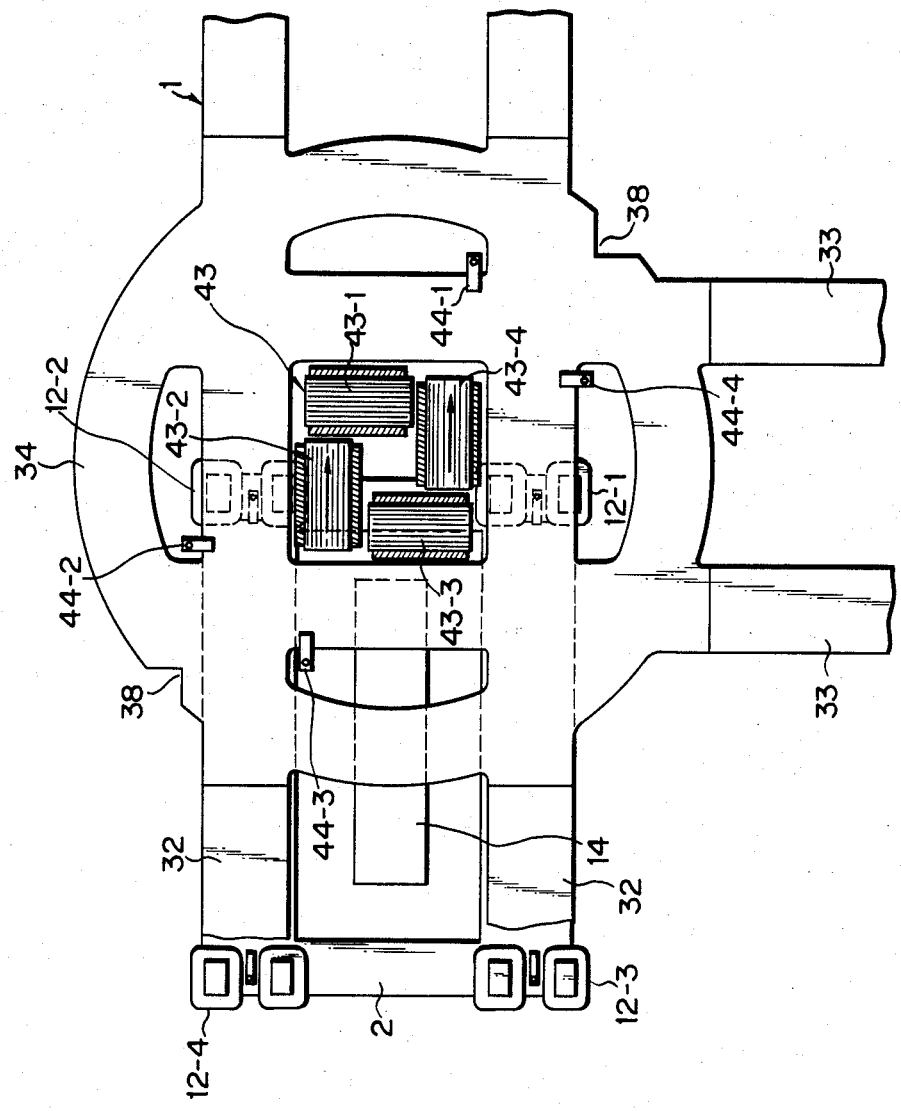

When carrier 2 reaches the location of coupling plate 34, as is shown in FIG. 6, whether or not all the optical sensors are off is determined in step 102. If any of the sensors is found to be on, microcomputer 51 concludes that carrier 2 is at the location of plate 34.

In such a case, whether or not carrier 2 is expected to be transferred from main lines 32 to branch lines 33 is determined in step 103. If there is a demand for such transfer, carrier 2 is controlled, in steps 104 to 109, so as to be stopped at the predetermined position in which it is rotated under coupling plate 34.

If there is no such demand, carrier 2 is made to pass coupling plate 34 and keep on running along main lines 32. In this case, therefore, the SSRs which causes carrier 2 to keep on running along the main lines, are selected and turned on, in step 131. Stators 43-2 and 43-4 are energized in the direction indicated by the arrows in FIG. 6. In step 132, the outputs of all the optical sensors are read. If all the sensors are found to be off, in step 133, microcomputer 51 concludes that carrier 2 has passed coupling plate 34.

In step 104, the SSRs for stopping carrier 2 are selected, the timer is set, and the selected SSR is turned on. Thus, stators 43-2 and 43-4 are energized to apply a thrust force to the running carrier. As a result, carrier 2 is running to the predetermined stop position.

Thereupon, in step 105, the outputs of optical sensors 44-1 and 44-3 are dead. In step 106, whether or not carrier 2 has reached the predetermined stop position is determined. In other words, whether or not sensors 44-1 and 44-3 are both on is determined. If either of these sensor is off, the flow from step 121 through 105 to 106 is repeated endlessly. If the two sensors are found to be simultaneously on, it is concluded that carrier 2 has reached the predetermined stop position.

Figure 7:
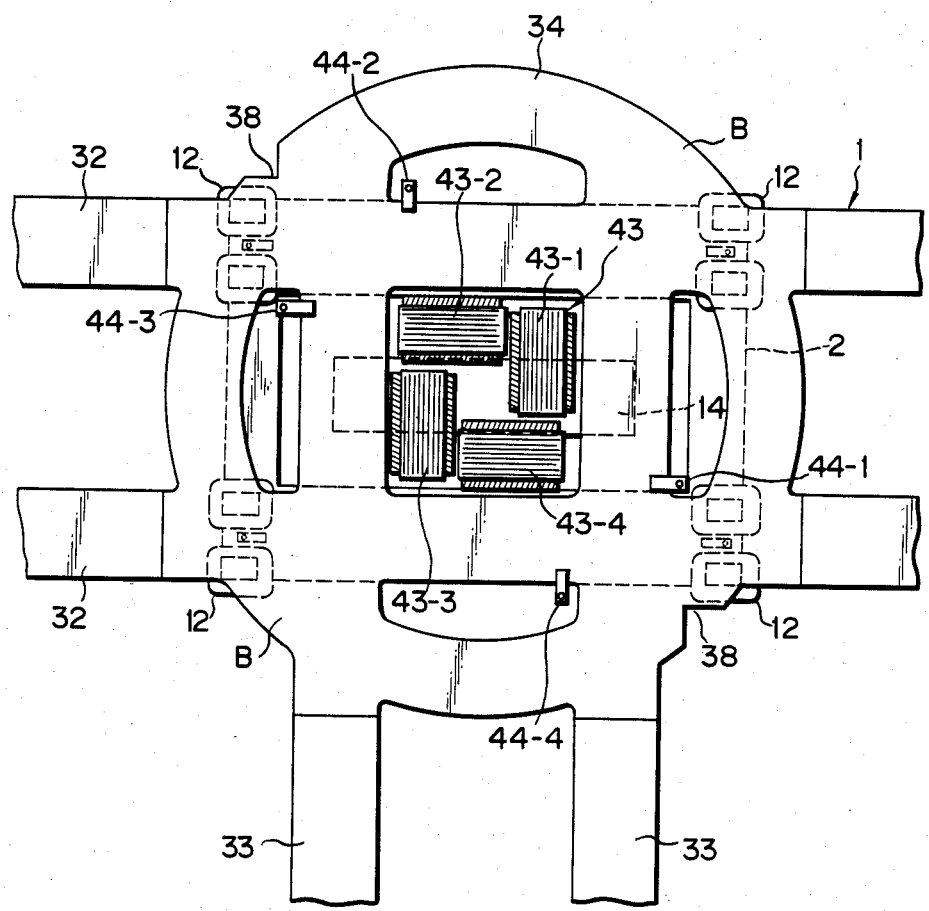

If the two sensors are both on, all the SSRs are turned off, in step 107. Thus, stators 43-2 and 43-4 cease to be energized, so that carrier 2 is stopped. The timer is reset, and the stators are kept off for a predetermined period of time. This is because even if carrier 2 is somewhat deviated from the predetermined stop position, it is attracted thereto by the action of junctions B, whose magnetic resistance is relatively low. In step 108, thereafter, the outputs of optical sensors 44-1 and 44-3 are read. In step 109, whether or not carrier 2 is stopped at the predetermined position is determined. In other words, whether or not optical sensors 44-1 and 44-3 are both on is determined. If the two sensors are simultaneously on, it is concluded that carrier 2 is stopped at the predetermined position, as is shown in FIG. 7.

If either of the two sensors is off, in step 109, it is concluded that carrier 2 is deviated from the predetermined stop position. If the force of inertia of carrier 2 is great, as is shown in FIG. 8, for example, the carrier may sometimes be stopped after passing the predetermined position. In such a case, the flow is returned to step 104. Stators 43-2 and 43-4 are energized in the direction indicated by the arrows in FIG. 8, to adjust the stop position of carrier 2.

Figure 9:
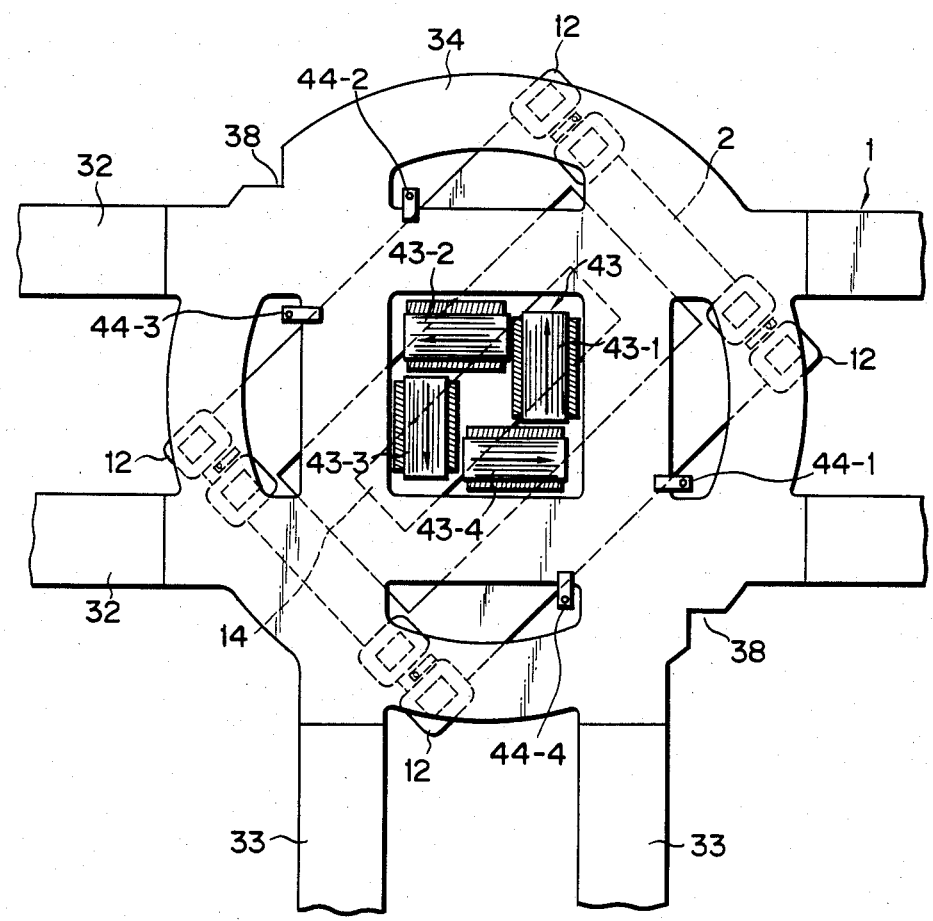

When carrier 2 stops at the predetermined position, the SSR for rotating it is selected, and the timer is set, in step 110. In step 111, the selected SSR is turned on, and stators 43-1 to 43-4 are energized in the directions indicated by the arrows in FIG. 9. Thus, carrier 2 is rotated under coupling plate 34. The optical sensor output is read.

In step 112, whether or not carrier 2 is rotated through the predetermined angle is determined. In other words, a decision is made on whether or not carrier 2 is located in the predetermined position, where it can be transferred from coupling plate 34 to branch lines 33. More specifically, whether or not optical sensors 44-2 and 44-4 are both on is determined. If either of these sensors is off, the flow from step 141 through 111 to 121 is repeated endlessly. If the two sensors are found to be simultaneously on, it is concluded that carrier 2 has rotated to the predetermined stop position.

Figure 10:
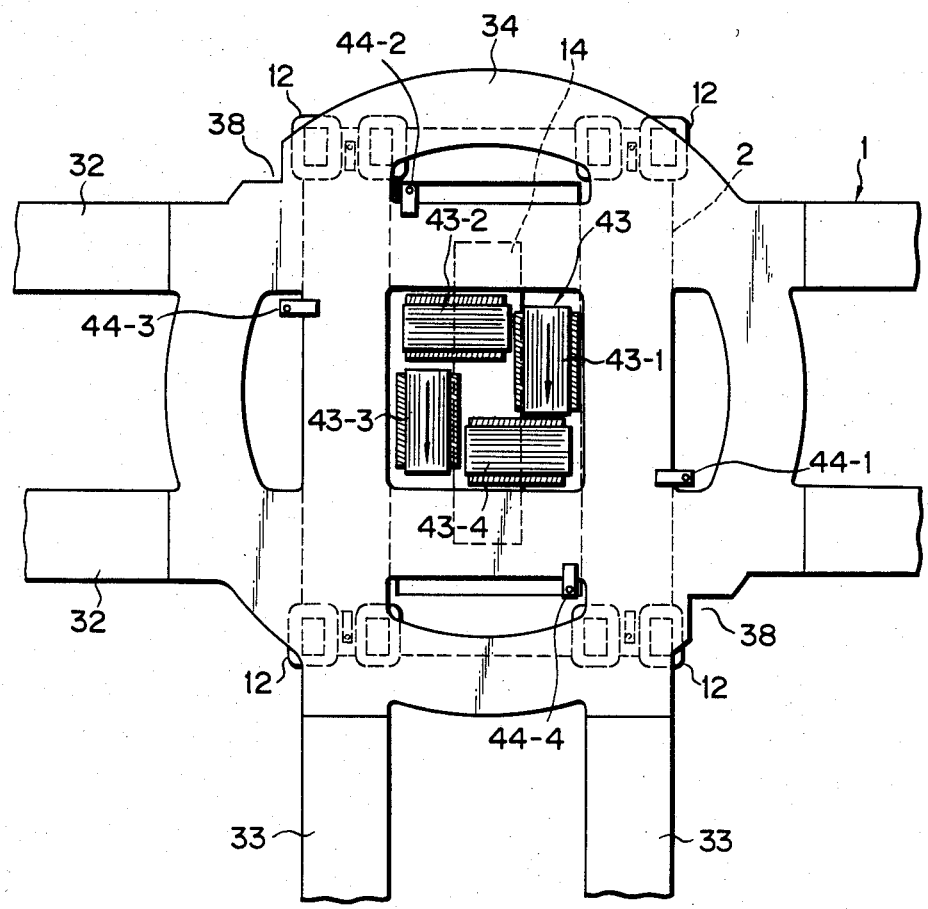
Figure 11:
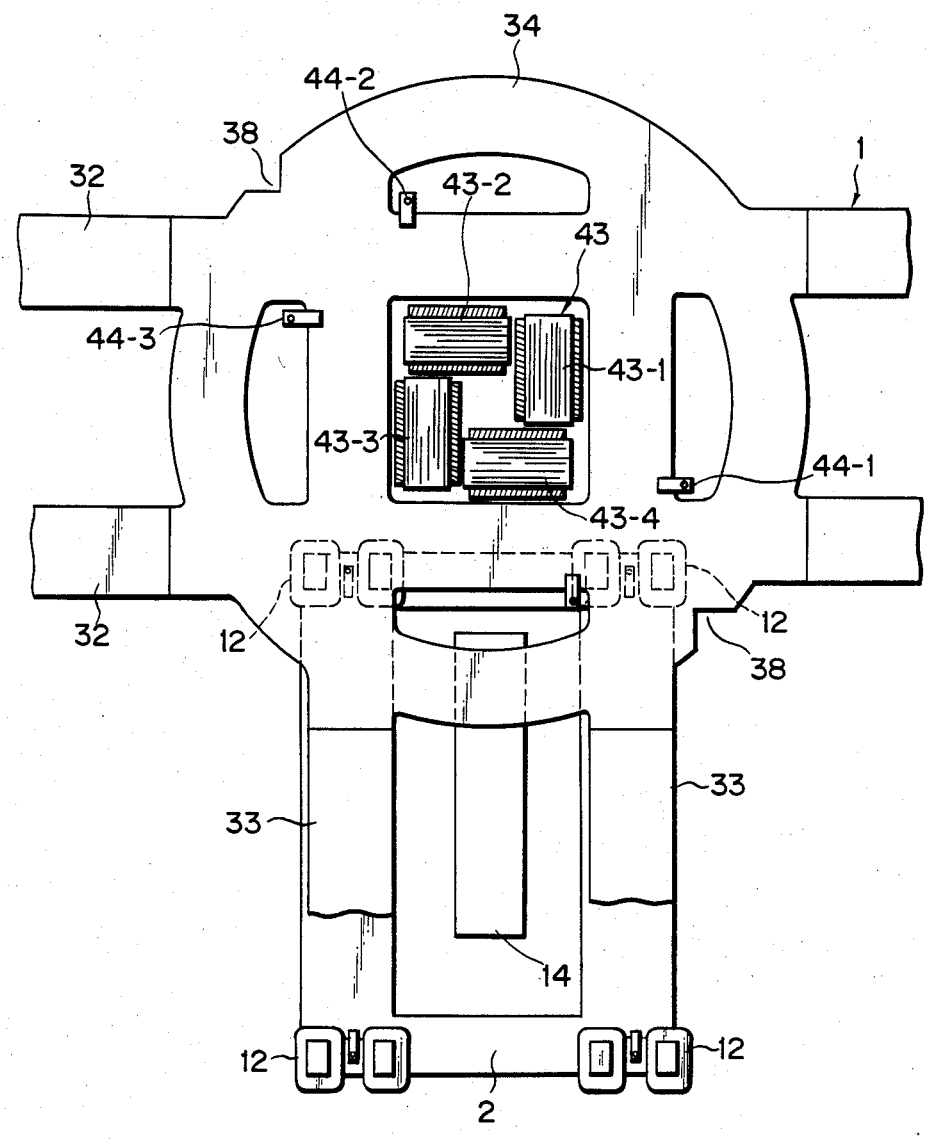

Thereupon, all the SSRs are turned off, in step 113. Thus, all of stators 43-1 to 43-4 cease to be energized, so that carrier 2 is stopped from rotating. The timer is reset, and the stators are kept off for a predetermined period of time. This is because even if carrier 2 is somewhat deviated from the predetermined stop position, it can be returned thereto by the action of notch portion 38, whose magnetic resistance is relatively high. In step 114, thereafter, the outputs of optical sensors 44-2 and 44-4 are read. In step 115, whether or not carrier 2 is stopped at the predetermined position is determined. In other words, whether or not optical sensors 44-2 and 44-4 are both on is determined. If the two switches are found to be simultaneously on, it is concluded that carrier 2 is stopped at the predetermined position, as is shown in FIG. 10.

If either of the two sensors is found to be off, in step 115, it is concluded that carrier 2 is deviated from the predetermined stop position. In such a case, the flow is returned to step 110. The stators are energized again, to adjust the stop position of carrier 2.

Finally, if carrier 2 is found to be stopped at the predetermined position, the SSR for transferring it to the branch lines is selected, the timer is set, and the selected SSRs are turned on, in step 116. Thereupon, stators 43-1 and 43-3 are energized in the direction indicated by the arrows in FIG. 10, so that carrier 2 is transferred to the branch lines. In step 117, the outputs of all the optical sensors are read. In step 118, whether or not all the optical sensors are off is determined. If all the sensors are found to be off, it is concluded that carrier 2 is running along the branch lines, after leaving coupling plate 34. Thus, carrier 2 is transferred from the main lines to the branch lines.

If YES is given in any of steps 121, 134, 141 and 142, that is, if the timer is found to have counted for one minute or more, it is concluded that carrier 2 is at a standstill. In this case, therefore, carrier 2 is regarded as out of order, and in step 122, all the SSRs are turned off, and an alarm is given.

Whether carrier 2 approaches coupling plate 34 from the right-hand side of FIGS. 6 to 11, or whether it travels along branch lines 33 when it comes to plate 34, the carrier is transferred to the branch or main lines by transfer apparatus 43.

In the embodiment described above, only a very small setting space is required by the transfer apparatus for transferring carrier 2, from main lines 32 to branch lines 33. Therefore, a number of branch lines can be made to diverge from a single main line, so that a number of carriers 2 can run in their respective directions, with less possibility of stagnation. Thus, the traveling time of carrier 2 can be reduced. Since the transfer apparatus does not have any mechanical elements, moreover, neither noise nor dust can be produced when carrier 2 is transferred from the main lines to the branch lines.

Figure 12:
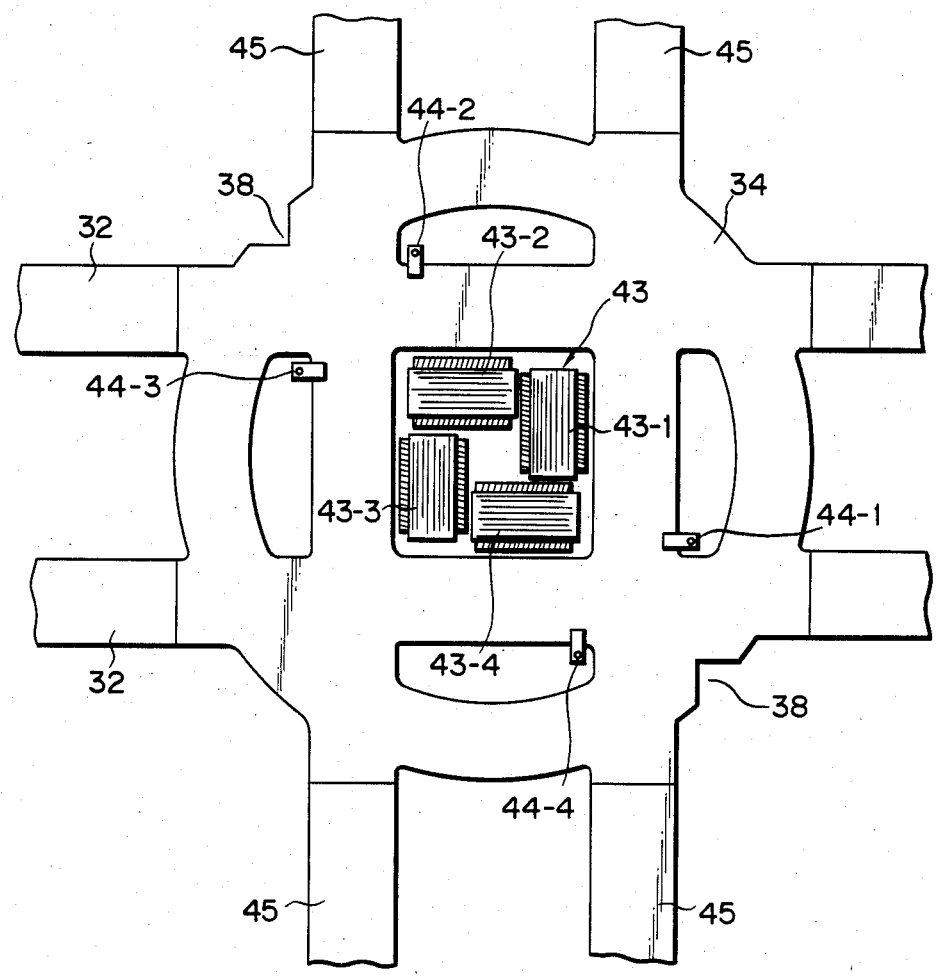
FIG. 12 is a plan view showing a modified example of the transportation system, with its guide rail cover removed, in which branch lines extend from both sides of the main lines.

In the embodiment described above, furthermore, the branch lines extend only in one direction from the main lines. Alternatively, however, branch lines 45 may be made to extend from both sides of main lines 32, as is shown in FIG. 12.

Figure 13:
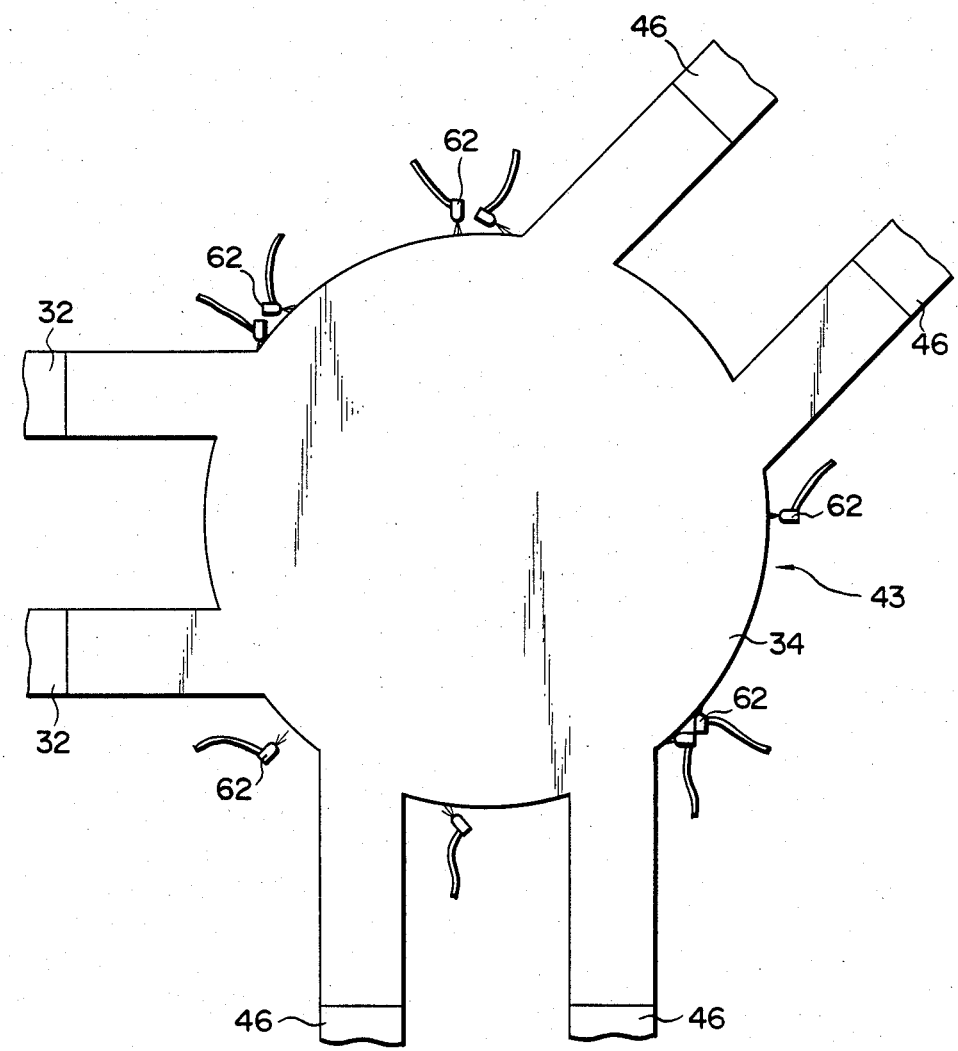
FIG. 13 is a plan view showing another modified example of the transportation system, with its guide rail cover removed, in which the transfer means is provided with air nozzles.

The carrier transfer apparatus may alternatively be designed so as to transfer carrier 2 by utilizing air pressure. As is shown in FIG. 13, for example, air nozzles 62 may be arranged so that they can blow air against carrier 2, thereby transferring the carrier from coupling plate 34 to branch lines 46.

According to the aforementioned embodiment, moreover, the guide rail includes a pair of main lines and a pair of branch lines. Alternatively, however, the main or branch lines used may be one, or three, or more, in number. Also, the magnetic unit may be constructed so that the carrier is caused to float by means of the magnetic force of the coils only, without using the permanent magnet.

In the embodiment described above, furthermore, the main lines are distinguished from the branch lines. This distinction, however, is made for convenience only. Thus, the transportation system of a floated-carrier type, according to the present invention, may be applied to a crossing carrier-transporting path, in which there is no distinction between main and branch lines.

What is claimed is:

1. A transportation system of a floated-carrier type for transporting a cargo between predetermined positions, comprising:
    a guide rail formed of a ferromagnetic material and including at least one first rail section and at least one second rail section intersecting the first rail section;
    a coupling section connecting the first and second rail sections;
    a carrier for carrying the cargo, said carrier being capable of running along the guide rail;
    at least one magnetic unit, having an electromagnet provided on the carrier, so as to face the guide rail, said carrier being adapted to suspend from the guide rail, in a non-contact manner, by means of an electromagnetic attractive force acting between the magnetic unit and the guide rail, so that a gap of a predetermined size is maintained between the magnetic unit and the guide rail; and
    transfer means provided at the coupling section, and adapted so that, at the coupling section, the carrier, having so far been running along the first rail section, is stopped, then rotated, then stopped from rotating when the carrier faces the second rail section, and then transferred from the coupling section to the second rail section, all in a non-contact manner.

2. The transportation system according to claim 1, wherein said transfer means includes stators of two linear induction motors for applying a propelling force along the first rail section to the carrier, and stators of another two linear induction motors for applying a propelling force along the second rail section to the carrier, said stators being arranged symmetrically with one another, with respect to the center of rotation, at the coupling section, and said carrier being provided with a reaction plate adapted to receive an electromagnetic force from the stators.

3. The transportation system according to claim 2, wherein said transfer means includes a relay for switching the stator to be energized; a sensor for detecting the position of carrier, at the coupling section, and delivering a detection signal; and a microcomputer for receiving the detection signal, and delivering a command to the relay.

4. The transportation system according to claim 3, wherein said sensor is an optical sensor of reflector type.

5. The transportation system according to claim 1, wherein said guide rail includes a pair of first rail sections and a pair of second rail sections; and said coupling section includes a pair of first connecting portions, spaced at a distance equal to that between the first rail sections, a pair of second connecting portions, spaced at a distance equal to that between the second rail sections, said first and second connecting portions intersecting one another, and a ring-shaped guide portion for guiding the carrier in rotation.

6. The transportation system according to claim 5, wherein said ring-shaped guide portion of the coupling section is formed having a notch portion.

7. The transportation system according to claim 1, wherein said guide rail includes a plurality of rail sections which extend from the coupling section, besides the first and second rail sections.

8. The transportation system according to claim 1, wherein said transfer means is composed of an air nozzle.

9. The transportation system according to claim 1, wherein said first and second rail sections intersect at an angle of approximately 90°.

10. The transportation system according to claim 1, wherein said magnetic unit is composed of permanent magnets capable of providing magnetic energy, with which the carrier can be kept floating against the weight thereof and the load thereon, and electromagnets adapted to be excited so as to maintain an air gap clearance, at which the magnetic attractive force acting between the permanent magnets and the ferromagnetic guide rail balances with the total weight of the carrier itself and the load, regardless of the weight of the load.

* * * * *